(12) United States Patent
Koike et al.

(10) Patent No.: US 7,938,630 B2
(45) Date of Patent: May 10, 2011

(54) COMPRESSOR

(75) Inventors: Wakana Koike, Sakai (JP); Kouki Morimoto, Sakai (JP); Masanori Yanagisawa, Kusatsu (JP); Toshiaki Yoshii, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 12/594,251

(22) PCT Filed: Mar. 21, 2008

(86) PCT No.: PCT/JP2008/000682
§ 371 (c)(1),
(2), (4) Date: Oct. 1, 2009

(87) PCT Pub. No.: WO2008/120463
PCT Pub. Date: Oct. 9, 2008

(65) Prior Publication Data
US 2010/0021321 A1    Jan. 28, 2010

(30) Foreign Application Priority Data
Apr. 2, 2007    (JP) .................................. 2007-096055

(51) Int. Cl.
*F04B 39/12* (2006.01)
*H02K 5/00* (2006.01)
*H02K 1/06* (2006.01)
(52) U.S. Cl. .................. 417/312; 417/410.1; 417/410.3; 310/89; 310/216.049; 310/216.136
(58) Field of Classification Search .................. 417/312, 417/410.1, 410.3; 310/89, 216.136, 216.049
See application file for complete search history.

(56) References Cited

U.S. PATENT DOCUMENTS

| 2,593,857 | A | * | 4/1952 | De Windt et al. | ...... 310/216.136 |
| 3,320,451 | A | * | 5/1967 | Wiley | .................... 310/216.042 |
| 4,466,182 | A | * | 8/1984 | Lamatsch et al. | ............... 29/596 |
| 5,261,800 | A | * | 11/1993 | Sakae | ............................ 418/63 |
| 6,582,207 | B2 | | 6/2003 | Matsumoto et al. | |

(Continued)

FOREIGN PATENT DOCUMENTS

| JP | 58-075431 | A1 | 5/1983 |
| JP | 02-275071 | A | 11/1990 |
| JP | 05-227685 | A | 9/1993 |
| JP | 2001-227468 | A | 8/2001 |

(Continued)

OTHER PUBLICATIONS

Examiner's First Report of corresponding Australian Application No. 2008233911 dated Nov. 3, 2010.

*Primary Examiner* — Charles G Freay
(74) *Attorney, Agent, or Firm* — Global IP Counselors (57) ABSTRACT

A compressor includes a compression mechanism, a motor coupled to the compression mechanism via a driving shaft, and a casing to accommodate the compression mechanism and the motor. The motor includes a stator, and a rotor disposed inside the stator and coupled to the driving shaft. The stator is spot-joined to the casing via a plurality of stator spot-joined portions at different positions along a circumferential direction about the driving shaft. Preferably, the stator spot-joined portions are disposed at different axial positions. Also, the stator spot-joined portions are preferably disposed at different circumferential positions from positions of compression mechanism-side spot-joined portions. When an accumulator is connected to the casing via a connection pipe, a straight line between any two of the plurality of stator spot-joined portions preferably crosses a vibration direction of a natural vibration mode of the accumulator.

19 Claims, 5 Drawing Sheets

U.S. PATENT DOCUMENTS

| | | |
|---|---|---|
| 7,044,719 B2 | 5/2006 | Yanagisawa et al. |
| 2002/0051715 A1 | 5/2002 | Matsumoto et al. |
| 2004/0119367 A1 | 6/2004 | Hiwaki et al. |
| 2004/0219037 A1* | 11/2004 | Higuchi et al. ............ 417/410.3 |
| 2005/0002804 A1* | 1/2005 | Yanagisawa et al. ...... 417/410.5 |

FOREIGN PATENT DOCUMENTS

| | | |
|---|---|---|
| JP | 2001-342954 A | 12/2001 |
| JP | 2003-222086 A | 8/2003 |
| JP | 2004-201428 A | 7/2004 |
| JP | 2005-133584 A | 5/2005 |

* cited by examiner

COMPRESSOR

CROSS-REFERENCE TO RELATED APPLICATIONS

This U.S. National stage application claims priority under 35 U.S.C. §119(a) to Japanese Patent Application No. 2007-096055, filed in Japan on Apr. 2, 2007, the entire contents of which are hereby incorporated herein by reference.

TECHNICAL FIELD

The present invention relates to a compressor including a compression mechanism, a motor, and a casing.

BACKGROUND ART

Conventional compressors employ a structure in which the motor stator of the motor is fixed to the inner circumference surface of the casing. For example, in the motor described in Japanese Laid-Open Patent Publication No. 2004-201428, the motor stator is fixed inside the casing by shrink-fit or press-fit.

SUMMARY OF THE INVENTION

Problems to be Solved by the Invention

A motor produces various vibrations. For example, with the type of a concentrated winding motor of Japanese Laid-Open Patent Publication No. 2004-201428, the motor rotor is rotated by successively energizing coils wound around the teeth, wherein as a magnetic flux locally flows through each tooth of the motor stator, there is an increased force in the radial direction urging the motor stator to deform. As a result, the motor stator vibrates in the radial direction.

Since the motor producing such vibrations is attached to the casing, the vibration of the motor is transmitted to the casing, thus vibrating the entire compressor.

In an arrangement where the motor stator is fixed to the casing by shrink-fit, as described in Japanese Laid-Open Patent Publication No. 2004-201428, there is an increased amount of vibration of the motor that is transmitted to the casing, and the vibration and the noise of the compressor become problematic.

The present invention has been made in view of the above, and has an object to reduce the vibration and the noise of a compressor due to the vibration of a motor.

Means for Solving the Problems

In the present invention, the motor stator and the casing are spot joined to each other so as to reduce the amount of vibration that is transmitted from the motor stator to the casing, and the arrangement of the spot joined portions is designed so as to reduce the vibration and the noise of the compressor.

Specifically, the present invention is directed to a compressor comprising a compression mechanism (2), a motor (4) coupled with the compression mechanism (2) via a driving shaft (5), and a casing (10) for accommodating the compression mechanism (2) and the motor (4). The motor (4) includes a motor stator (41), and a motor rotor (42) disposed inside the motor stator (41) and coupled to the driving shaft (5), the motor stator (41) is spot-joined to the casing (10) via a plurality of spot joined portions (6a, ..., 6b, ...) provided at different positions in an axial direction of the driving shaft (5), and the plurality of spot-joined portions (6a, ..., 6b, ...) are provided at different positions in a circumferential direction of the driving shaft (5).

With such a configuration, although the vibration of the motor (4) is transmitted to the casing (10) via joined portions between the motor (4) and the casing (10), since the motor (4) and the casing (10) are spot-joined to each other via the spot-joined portions (6a, ..., 6b, ...), the vibration transmitted from the motor (4) to the casing (10) is reduced, as compared with such a configuration as that of the compressor of Japanese Laid-Open Patent Publication No. 2004-201428 identified above, where the motor stator (41) and the casing (10) are surface-joined by shrink-fit, or the like.

These spot-joined portions (6a, ..., 6b, ...) are not provided only at one position in the axial direction of the driving shaft (5), i.e., only on one plane perpendicular to the axial direction, but are provided at different positions in the axial direction. Therefore, the vibration of the motor (4) can be transmitted to the casing (10) while being dispersed in the axial direction. Moreover, these spot-joined portions (6a, ..., 6b, ...) are provided at different positions also in the circumferential direction of the driving shaft (5). Therefore, the vibration of the motor (4) can be transmitted to the casing (10) while being dispersed in the circumferential direction. As a result, it is possible to reduce the vibration of the compressor, and also to reduce the volume of the noise radiated from the compressor.

The second aspect is according to the first aspect, wherein an accumulator (7) is connected to the casing (10) via a connection pipe (15), and a straight line between any two of the plurality of spot-joined portions (6a, ..., 6b, ...) crosses a vibration direction of a natural vibration mode of the accumulator (7) as viewed in a plan view.

With such a configuration, the accumulator (7) connected to the compressor via the connection pipe (15) has a natural vibration mode. On the other hand, in the compressor, the spot-joined portions (6a, ..., 6b, ...), to which the vibration of the motor (4) is transmitted, vibrate strongly. Not only do the spot-joined portions (6a, ..., 6b, ...) vibrate in the radial direction, the circumferential direction and the axial direction of the driving shaft (5), but a vibration occurs also in the direction of a straight line between any two of the plurality of spot-joined portions (6a, ..., 6b, ...) due to the influence of the spot-joined portions on each other. In view of this, in the second aspect, the plurality of spot-joined portions (6a, ..., 6b, ...) are arranged so that a straight line between any two of the spot-joined portions (6a, ..., 6b, ...) crosses, i.e., is not parallel to, the vibration direction of a natural vibration mode of the accumulator (7) as viewed in a plan view. Then, it is possible to prevent the compressor from vibrating in the vibration direction of a natural vibration mode of the accumulator (7) due to the vibration of the motor (4), and to thereby suppress the resonance between the compressor and the accumulator (7), thus reducing the vibration of the compressor. A "plan view" as used herein means a view as seen in a direction along the axis of the driving shaft (5) from a point on the axis.

The third aspect is according to the first or second aspect, wherein the compression mechanism (2) is spot-joined to the casing (10) via a plurality of compression mechanism-side spot-joined portions (20, 20, ...), and the plurality of spot-joined portions (6a, ..., 6b, ...) are provided at positions different from the compression mechanism-side spot-joined portions (20, 20, ...) in the circumferential direction of the driving shaft (5).

With such a configuration, the vibration of the motor stator (41) is transmitted also to the motor rotor (42), and the vibration which has transmitted to the motor rotor (42) is transmitted to the compression mechanism (2) via the driving shaft (5), and is transmitted further to the casing (10) via the compression mechanism-side spot-joined portions (20, 20, . . . ). In such a configuration, as the spot-joined portions (6a, . . . , 6b, . . . ) between the motor stator (41) and the casing (10) are provided at positions different from the compression mechanism-side spot-joined portions (20, 20, . . . ) in the circumferential direction of the driving shaft (5), the vibration of the motor (4) transmitted from the motor stator (41) to the casing (10) and the vibration of the motor (4) transmitted from the compression mechanism (2) to the casing (10) can be dispersed in the circumferential direction.

The compression mechanism (2) itself is also vibrating, and the vibration of the compression mechanism (2) is transmitted to the casing (10) via the compression mechanism-side spot-joined portions (20, 20, . . . ). That is, as described above, as the spot-joined portions (6a, . . . , 6b, . . . ) between the motor stator (41) and the casing (10) are provided at positions different from the compression mechanism-side spot-joined portions (20, 20, . . . ) in the circumferential direction of the driving shaft (5), the vibration of the motor (4) transmitted from the motor stator (41) to the casing (10) and the vibration of the compression mechanism (2) itself transmitted from the compression mechanism (2) to the casing (10) can be dispersed in the circumferential direction.

The fourth aspect is directed to a compressor comprising a compression mechanism (2), a motor (4) coupled with the compression mechanism (2) via a driving shaft (5), and a casing (10) for accommodating the compression mechanism (2) and the motor (4). An accumulator (7) is connected to the casing (10) via a connection pipe (15), the motor (4) includes a motor stator (41), and a motor rotor (42) disposed inside the motor stator (41) and coupled to the driving shaft (5), the motor stator (41) is spot-joined to the casing (10) via a plurality of spot-joined portions (6a, . . . , 6b, . . . ) provided at different positions in a circumferential direction of the driving shaft (5), and a straight line between any two of the plurality of spot-joined portions (6a, . . . , 6b, . . . ) crosses a vibration direction of a natural vibration mode of the accumulator (7) as viewed in a plan view.

With such a configuration, since the plurality of spot-joined portions (6a, . . . , 6b, . . . ) are provided at different positions in the circumferential direction of the driving shaft (5), the vibration of the motor (4) can be transmitted to the casing (10) while being dispersed in the circumferential direction. As a result, it is possible to reduce the vibration of the compressor, and to disperse the noise radiated from the compressor in the circumferential direction, thereby reducing the volume of the noise as a whole.

In addition, as a straight line between any two of the plurality of spot-joined portions (6a, . . . , 6b, . . . ) crosses, i.e., is not parallel to, the vibration direction of a natural vibration mode of the accumulator (7) as viewed in a plan view, it is possible to prevent the compressor from vibrating in the vibration direction of a natural vibration mode of the accumulator (7) due to the vibration of the motor (4), and to thereby suppress the resonance between the compressor and the accumulator (7), thus reducing the vibration of the compressor.

The fifth aspect is according to the fourth aspect, wherein the compression mechanism (2) is spot-joined to the casing (10) via a plurality of compression mechanism-side spot-joined portions (20, 20, . . . ), and the plurality of spot-joined portions (6a, . . . , 6b, . . . ) are provided at positions different from the compression mechanism-side spot-joined portions (20, 20, . . . ) in the circumferential direction of the driving shaft (5).

With such a configuration, as described above, as the spot-joined portions (6a, . . . , 6b, . . . ) between the motor stator (41) and the casing (10) are provided at positions different from the compression mechanism-side spot-joined portions (20, 20, . . . ) in the circumferential direction of the driving shaft (5), the vibration of the motor (4) transmitted from the motor stator (41) to the casing (10) and the vibration of the motor (4) transmitted from the compression mechanism (2) to the casing (10) can be dispersed in the circumferential direction, and the vibration of the motor (4) transmitted from the motor stator (41) to the casing (10) and the vibration of the compression mechanism (2) itself transmitted from the compression mechanism (2) to the casing (10) can be dispersed in the circumferential direction.

The sixth aspect is directed to a compressor comprising a compression mechanism (2), a motor (4) coupled with the compression mechanism (2) via a driving shaft (5), and a casing (10) for accommodating the compression mechanism (2) and the motor (4). The motor (4) includes a motor stator (41), and a motor rotor (42) disposed inside the motor stator (41) and coupled to the driving shaft (5), the compression mechanism (2) is spot-joined to the casing (10) via a plurality of compression mechanism-side spot-joined portions (20, 20, . . . ), the motor stator (41) is spot-joined to the casing (10) via a plurality of spot-joined portions (6a, . . . , 6b, . . . ) provided at different positions in a circumferential direction of the driving shaft (5), and the plurality of spot-joined portions (6a, . . . , 6b, . . . ) are provided at positions different from the compression mechanism-side spot-joined portions (20, 20, . . . ) in the circumferential direction of the driving shaft (5).

With such a configuration, as the plurality of spot-joined portions (6a, . . . , 6b, . . . ) are provided at different positions in the circumferential direction of the driving shaft (5), the vibration of the motor (4) can be transmitted to the casing (10) while being dispersed in the circumferential direction. As a result, it is possible to reduce the vibration of the compressor, and to disperse the noise radiated from the compressor in the circumferential direction, thereby reducing the volume of the noise as a whole.

In addition, as the spot-joined portions (6a, . . . , 6b, . . . ) between the motor stator (41) and the casing (10) are provided at positions different from the compression mechanism-side spot-joined portions (20, 20, . . . ) in the circumferential direction of the driving shaft (5), the vibration of the motor (4) transmitted from the motor stator (41) to the casing (10) and the vibration of the motor (4) transmitted from the compression mechanism (2) to the casing (10) can be dispersed in the circumferential direction, and the vibration of the motor (4) transmitted from the motor stator (41) to the casing (10) and the vibration of the compression mechanism (2) itself transmitted from the compression mechanism (2) to the casing (10) can be dispersed in the circumferential direction.

The seventh aspect is according to one of the second, fourth and fifth aspects, wherein a straight line between any two of the plurality of spot-joined portions (6a, . . . , 6b, . . . ) crosses at least a vibration direction of one of natural vibration modes of the accumulator (7) in which the accumulator (7) vibrates in a direction of a straight line between a center of gravity of the casing (10) and a center of gravity of the accumulator (7) as viewed in a plan view and a vibration direction of another one of the natural vibration modes of the accumulator (7) in which the accumulator (7) vibrates in a direction perpendicular to the straight line as viewed in a plan view.

With such a configuration, the natural vibration mode in which the accumulator (7) vibrates in the direction of the straight line between the center of gravity of the casing (10) and the center of gravity of the accumulator (7) as viewed in a plan view, and the natural vibration mode in which the accumulator (7) vibrates in the direction perpendicular to the straight line as viewed in a plan view, are those among the natural vibration modes of the accumulator (7) in which a strong vibration is likely to occur. In view of this, as the plurality of spot-joined portions (6a, . . . , 6b, . . . ) are arranged so that the vibration directions of such natural vibration modes and a straight line between any two of the plurality of spot-joined portions (6a, . . . , 6b, . . . ) cross, i.e., are not parallel to, each other, it is possible to prevent the compressor from vibrating, due to the vibration of the motor (4), in vibration directions of those of the natural vibration modes of the accumulator (7) in which the compressor is likely to vibrate, and to thereby further suppress the resonance between the compressor and the accumulator (7), thus further reducing the vibration of the compressor.

The eighth aspect is according to one of the first to seventh aspects, wherein the motor stator (41) includes an annular stator body (45), and a plurality of teeth (46, 46, . . . ) provided protruding radially inwardly from an inner circumference surface of the stator body (45), and the motor (4) is a concentrated winding motor in which coils are wound around the teeth (46, 46, . . . ).

With such a configuration, with a concentrated winding motor, as a magnetic flux locally flows through the teeth (46, 46, . . . ), a large force in the radial direction acts upon the motor stator (41), and the motor stator (41) is likely to vibrate in the radial direction. Therefore, by employing the first to seventh aspects, it is possible to more effectively reduce the vibration of the compressor.

The ninth aspect is according to the eighth aspect, wherein the plurality of spot-joined portions (6a, . . . , 6b, . . . ) are provided at positions different from the teeth (46, 46, . . . ) of the motor stator (41) in the circumferential direction of the driving shaft (5).

With such a configuration, while portions of the motor stator (41) in the teeth (46, 46, . . . ) vibrate strongly in the radial direction, it is possible to reduce the vibration of the motor (4) transmitted to the casing (10) by avoiding the teeth (46, 46, . . . ) portions and by spot-joining portions of the motor stator (41) where the teeth (46, 46, . . . ) are absent to the casing (10).

The tenth aspect is according to one of the first to ninth aspects, wherein the motor stator (41) includes a plurality of steel plates (42a, 42a, . . . ) stacked together in an axial direction of the driving shaft (5), and at least three ones of the plurality of spot-joined portions (6a, . . . , 6b, . . . ) are provided in each of at least two planes orthogonal to the axial direction of the driving shaft (5).

With such a configuration, the plurality of spot-joined portions (6a, . . , 6b, . . . ) are provided at different positions in the axial direction of the driving shaft (5), and at least three spot-joined portions (6a, . . . , 6b, . . . ) are provided in each of the different axial positions where the spot-joined portions (6a, . . . , 6b, . . . ) are provided. As a result, it is possible to prevent the steel plates (42a, 42a, . . . ) stacked together from being misaligned in a direction perpendicular to the axial direction of the driving shaft (5), and to attach the motor stator (41) to the casing (10) in a stable state.

Effects of the Invention

According to the present invention, because the motor stator (41) is spot-joined to the casing (10) via the spot-joined portions (6a, . . . , 6b, . . . ), and the plurality of spot-joined portions (6a, . . . , 6b, . . . ) are arranged at different positions in the axial direction and the circumferential direction of the driving shaft (5), it is possible to reduce the vibration of the motor (4) transmitted to the casing (10), and to disperse the vibration transmitted to the casing (10) in the axial direction and the circumferential direction of the driving shaft (5), thus reducing the vibration and the noise of the compressor as a whole.

According to the second aspect, because the plurality of spot-joined portions (6a, . . . , 6b, . . . ) are arranged so that a straight line between any two of the spot-joined portions (6a, . . . , 6b, . . . ) is not parallel to the vibration direction of a natural vibration mode of the accumulator (7), it is possible to suppress the resonance between the compressor and the accumulator (7), thus further reducing the vibration of the compressor.

According to the third aspect, because the plurality of spot-joined portions (6a, . . . , 6b, . . . ) are provided at positions different from the compression mechanism-side spot-joined portions (20, 20, . . . ) in the circumferential direction of the driving shaft (5), the vibration of the motor (4) transmitted from the motor stator (41) to the casing (10) and the vibration of the motor (4) transmitted from the compression mechanism (2) to the casing (10) can be dispersed in the circumferential direction, and the vibration of the motor (4) transmitted from the motor stator (41) to the casing (10) and the vibration of the compression mechanism (2) itself transmitted from the compression mechanism (2) to the casing (10) can be dispersed in the circumferential direction.

According to the fourth aspect, because the plurality of spot-joined portions (6a, . . . , 6b, . . . ) are provided at different positions in the circumferential direction of the driving shaft (5), the vibration of the motor (4) can be transmitted to the casing (10) while being dispersed in the circumferential direction, thus reducing the vibration of the compressor, and the noise radiated from the compressor can be reduced by dispersing it in the circumferential direction. Moreover, as the plurality of spot-joined portions (6a, . . . , 6b, . . . ) are arranged so that a straight line between any two of the spot-joined portions (6a, . . . , 6b, . . . ) is not parallel to the vibration direction of a natural vibration mode of the accumulator (7), it is possible to suppress the resonance between the compressor and the accumulator (7), thus further reducing the vibration of the compressor.

According to the fifth aspect, because the plurality of spot-joined portions (6a, . . . , 6b, . . . ) are provided at positions different from the compression mechanism-side spot-joined portions (20, 20, . . . ) in the circumferential direction of the driving shaft (5), the vibration of the motor (4) transmitted from the motor stator (41) to the casing (10) and the vibration of the motor (4) transmitted from the compression mechanism (2) to the casing (10) can be dispersed in the circumferential direction, and the vibration of the motor (4) transmitted from the motor stator (41) to the casing (10) and the vibration of the compression mechanism (2) itself transmitted from the compression mechanism (2) to the casing (10) can be dispersed in the circumferential direction.

According to the sixth aspect, because the plurality of spot-joined portions (6a, . . . , 6b, . . . ) are provided at different positions in the circumferential direction of the driving shaft (5), the vibration of the motor (4) can be transmitted to the casing (10) while being dispersed in the circumferential direction, thus reducing the vibration of the compressor, and the noise radiated from the compressor can be reduced by dispersing it in the circumferential direction. Moreover, as the plurality of spot-joined portions (6a, . . . , 6b, . . . ) are provided at positions different from the compression mechanism-side spot-joined portions (20, 20, . . . ) in the circumferential direction of the driving shaft (5), the vibration of the motor (4) transmitted from the motor stator (41) to the casing (10) and the vibration of the motor (4) transmitted from the compression mechanism (2) to the casing (10) can be dispersed in the circumferential direction, and the vibration of the motor (4) transmitted from the motor stator (41) to the casing (10) and the vibration of the compression mechanism (2) itself transmitted from the compression mechanism (2) to the casing (10) can be dispersed in the circumferential direction.

According to the seventh aspect, because the plurality of spot-joined portions (6a, ..., 6b, ...) are arranged so that a straight line between any two spot-joined portions is not parallel to at least the vibration direction of one of the natural vibration modes of the accumulator (7) in which the accumulator (7) vibrates in the direction of the straight line between the center of gravity of the casing (10) and the center of gravity of the accumulator (7) and the vibration direction of another one of the natural vibration modes of the accumulator (7) in which the accumulator (7) vibrates in the direction perpendicular to the straight line as viewed in a plan view, it is possible to prevent the compressor from vibrating, due to the vibration of the motor (4), in vibration directions of those of the natural vibration modes of the accumulator (7) in which the compressor is likely to vibrate.

According to the eighth aspect, for a concentrated winding motor, which is likely to vibrate in the radial direction, it is possible to more effectively reduce the vibration of the compressor.

According to the ninth aspect, because the spot-joined portions (6a, ..., 6b, ...) are provided on the motor stator (41) while avoiding the teeth (46, 46, ...) in the circumferential direction, it is possible to further reduce the vibration of the motor (4) transmitted to the casing (10).

According to the tenth aspect, because at least three spot-joined portions (6a, ..., 6b, ...) are provided on the motor stator (41) having the steel plates (42a, 42a, ...) stacked together in each of at least two planes perpendicular to the axial direction of the driving shaft (5), it is possible to prevent the steel plates (42a, 42a, ...) from being misaligned, and to attach the motor stator (41) to the casing (10) in a stable state.

DETAILED DESCRIPTION OF THE INVENTION

An embodiment of the present invention will now be described in detail with reference to the drawings.

Figure 2:
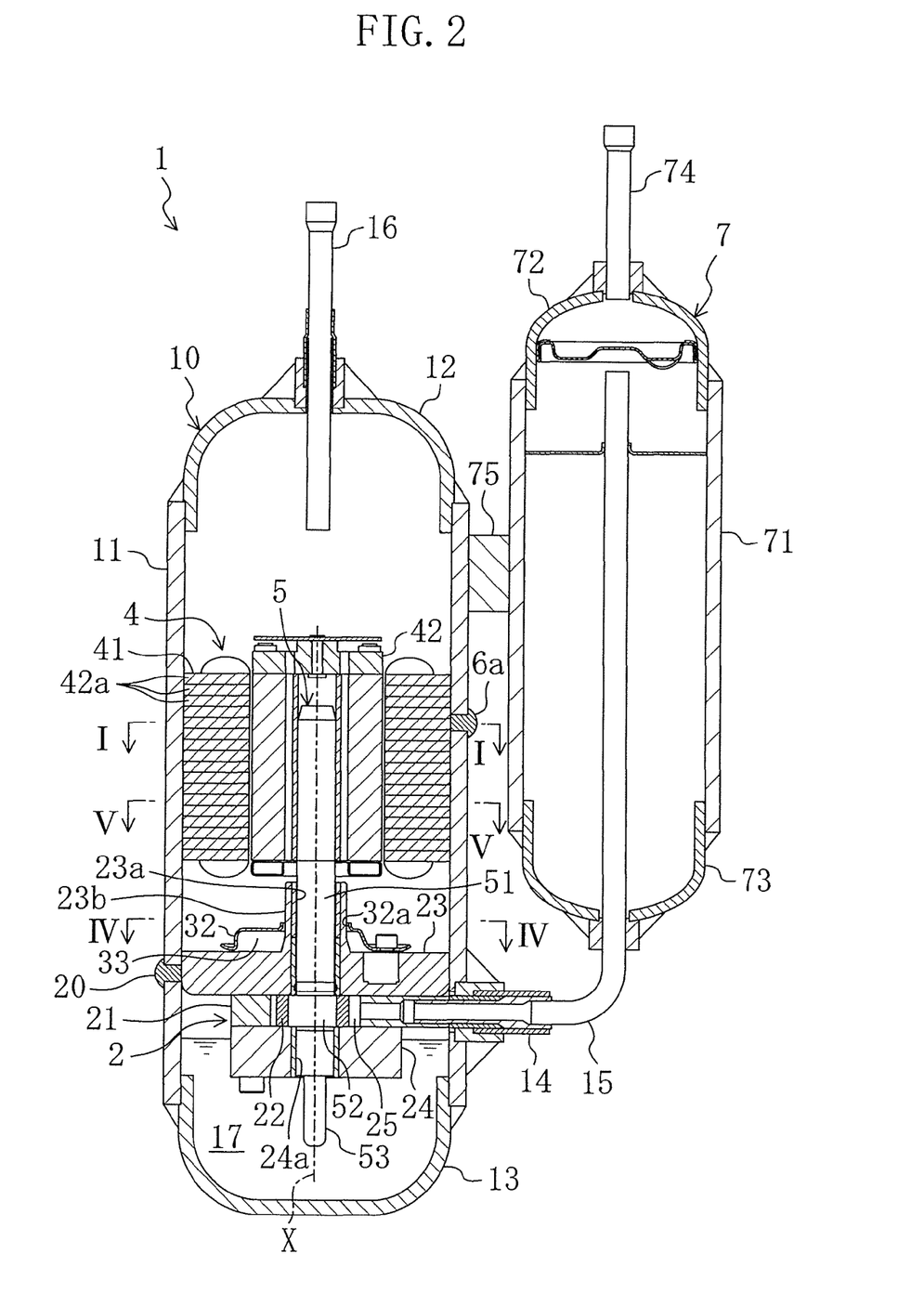
FIG. 2 is a longitudinal cross-sectional view of the compressor.

A closed compressor (hereinafter referred to also simply as "compressors") (1) of the present embodiment is an oscillating piston-type rotary compressor. As shown in FIG. 2, the compressor (1) includes a compression mechanism (2) for compressing a coolant as a working fluid, a motor (4) for driving the compression mechanism (2), and a casing (10) for accommodating the compression mechanism (2) and the motor (4). The compression mechanism (2) and the motor (4) are disposed inside the casing (10), respectively in a lower portion and an upper portion thereof, and the compression mechanism (2) and the motor (4) are coupled together by a driving shaft (5). The compressor (1) is a so-called "high pressure dome-type compressor", which is formed as a fully closed type compressor.

The casing (10) includes a cylindrical trunk portion (11), and bowl-shaped upper and lower lid portions (12, 13) fixed by welding respectively to the top and bottom of the trunk portion (11). The trunk portion (11) is provided with a suction port (14) running through the trunk portion (11), and a suction pipe (15) is connected to the suction port (14). A discharge pipe (16) running through the upper lid portion (12) is connected to the upper lid portion (12). An oil reservoir (17) holding a lubricating oil therein is formed in the bottom portion of the casing (10).

The driving shaft (5) includes a main shaft (51) extending in the axial direction of the trunk portion (11) in the casing (10), an eccentric shaft (52) that is eccentric by a predetermined amount off of an axis (X) of the main shaft (51), and a centrifugal pump (53) provided at the lower end of the main shaft (51). The eccentric shaft (52) is provided at a position corresponding to the compression mechanism (2), with a piston (22) of the compression mechanism (2) to be described later attached thereto. The centrifugal pump (53) is immersed in the oil reservoir (17) in the bottom portion of the casing (10), and sucks up the lubricating oil of the oil reservoir (17) to supply it to various sliding portions of the compression mechanism (2), etc.

Figure 3:
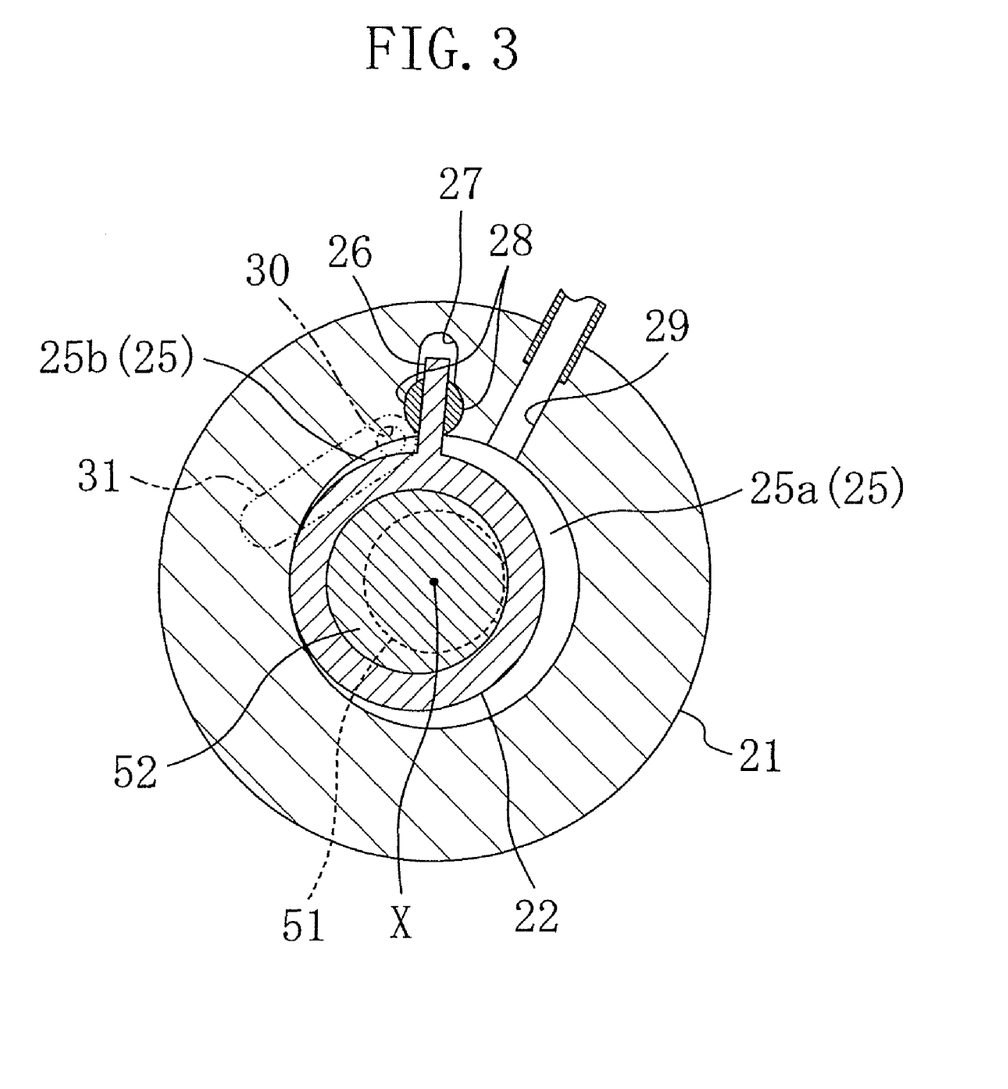
FIG. 3 is a transverse cross-sectional view of a compression mechanism.

The compression mechanism (2) includes a cylinder (21), and the piston (22) oscillating in the cylinder (21), as shown in FIG. 3.

The cylinder (21) is formed in a cylindrical shape. A front head (23) is provided at the upper end of the cylinder (21), and a rear head (24) is provided at the lower end of the cylinder (21). The front head (23) and the rear head (24) are connected together by a bolt, whereby the cylinder (21) is sandwiched vertically by the front head (23) and the rear head (24).

A boss portion (23b) is formed at the center of the front head (23), and a through hole (23a) is formed so as to pass vertically through the boss portion (23b). A through hole (24a) is formed also at the center of the rear head (24). The main shaft (51) of the driving shaft (5) is rotatably inserted through these through holes (23a, 24a), and the through holes (23a, 24a) form a bearing for the driving shaft (5).

Figure 4:
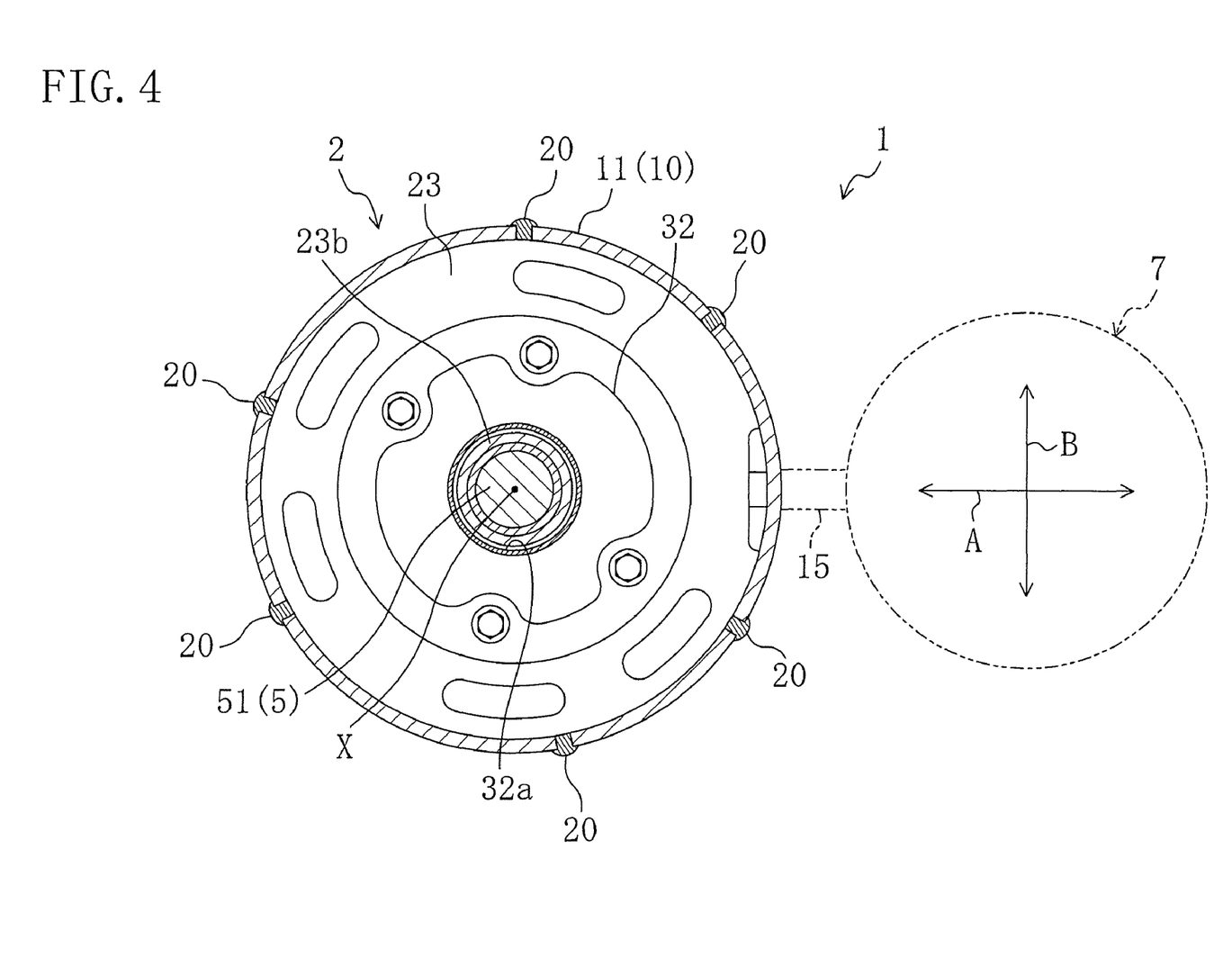
FIG. 4 is a cross-sectional view taken along line IV-IV of FIG. 2.

The front head (23) is spot-joined to the trunk portion (11) of the casing (10) via a plurality of compression mechanism-side welded portions (20, 20, ...), as shown in FIG. 4. The compression mechanism-side welded portion (20) is formed by spot welding, and such portions are provided at a total of six positions. Specifically, the six compression mechanism-side welded portions (20, 20, ...) are arranged so as not to be equidistant from one another in the circumferential direction around the axis (X) of the driving shaft (5). Specifically, the six compression mechanism-side welded portions (20, 20, ...) are arranged so that angles between adjacent compression mechanism-side welded portions (20, 20) in the circumferential direction are α[°] and β[°] (α+β=120 [°], α≠β) alternately. These compression mechanism-side welded portions (20, 20, ...) form compression mechanism-side spot-joined portions.

The piston (22) is disposed in the space surrounded by the cylinder (21), the front head (23) and the rear head (24). The top surface of the piston (22) abuts on the front head (23), and the bottom surface of the piston (22) abuts on the rear head (24). Thus, a cylinder chamber (25) is defined in the space surrounded by the cylinder (21), the piston (22), the front head (23) and the rear head (24). The eccentric shaft (52) of the driving shaft (5) is located in the space between the front head (23) and the rear head (24), and the piston (22) is rotatably fitted around the eccentric shaft (52). The piston (22) is substantially in contact with the inner circumference surface of the cylinder (21) (strictly speaking, there is an oil film of the lubricating oil therebetween). Then, as the driving shaft (5) is rotated, the piston (22) eccentrically rotates about the axis (X) of the driving shaft (5) while sliding against the inner circumference surface of the cylinder (21).

The piston (22) is provided with a blade (26) extending outwardly in the radial direction from the outer circumference surface thereof. On the other hand, a blade supporting space (27) for supporting the blade (26) is formed in the cylinder (21).

The blade (26) is a flat-plate member, and the height thereof is equal to that of the piston (22). The blade (26) partitions the cylinder chamber (25) into a low-pressure chamber (25a) and a high-pressure chamber (25b).

The blade supporting space (27) extends in the radial direction from the inner circumference surface of the cylinder (21) while passing through the cylinder (21) in the vertical direction. Two oscillating bushes (28, 28) are pivotally disposed at the radially inner end of the blade supporting space (27). Each oscillating bush (28) is a columnar member whose cross section is in a generally semicircular shape. The blade (26) of the piston (22) is supported by these oscillating bushes (28, 28) while being interposed therebetween.

That is, the blade (26) of the piston (22) is allowed to move back and forth with respect to the oscillating bushes (28, 28), and the blade (26) and the oscillating bushes (28, 28) are allowed to pivot with respect to the cylinder (21). As a result, the piston (22) can eccentrically rotate in the cylinder chamber (25) while oscillating about the oscillating bushes (28, 28).

A suction passage (29) is formed so as to pass through the cylinder (21) in the radial direction. The upstream end of the suction passage (29) communicates with a suction port (14), which is provided in the trunk portion (11) of the casing (10), and the downstream end thereof is open into the low-pressure chamber (25a) of the cylinder chamber (25) in the vicinity of the oscillating bushes (28, 28).

A discharge port (30) is formed so as to pass through the front head (23) in the thickness direction. The discharge port (30) is open facing the high-pressure chamber (25b) of the cylinder chamber (25) in the vicinity of the oscillating bushes (28, 28). A reed valve (31) as a discharge valve for opening/closing the discharge port (30) is provided on the upper surface of the front head (23) (the surface opposite to the piston (22)). A muffler cover (32) is provided on the upper surface of the front head (23), thereby forming a muffler chamber (33) in the space between the front head (23) and the muffler cover (32). An opening (32a) is provided at the center of the muffler cover (32), and the muffler cover (32) is attached to the upper surface of the front head (23) with the boss portion (23b) of the front head (23) inserted through the opening (32a). A gap is formed between the opening (32a) of the muffler cover (32) and the boss portion (23b) of the front head (23), and the muffler chamber (33) communicates with the space in the casing (10) above the compression mechanism (2).

The motor (4) includes a stator (41) and a rotor (42).

Figure 1:
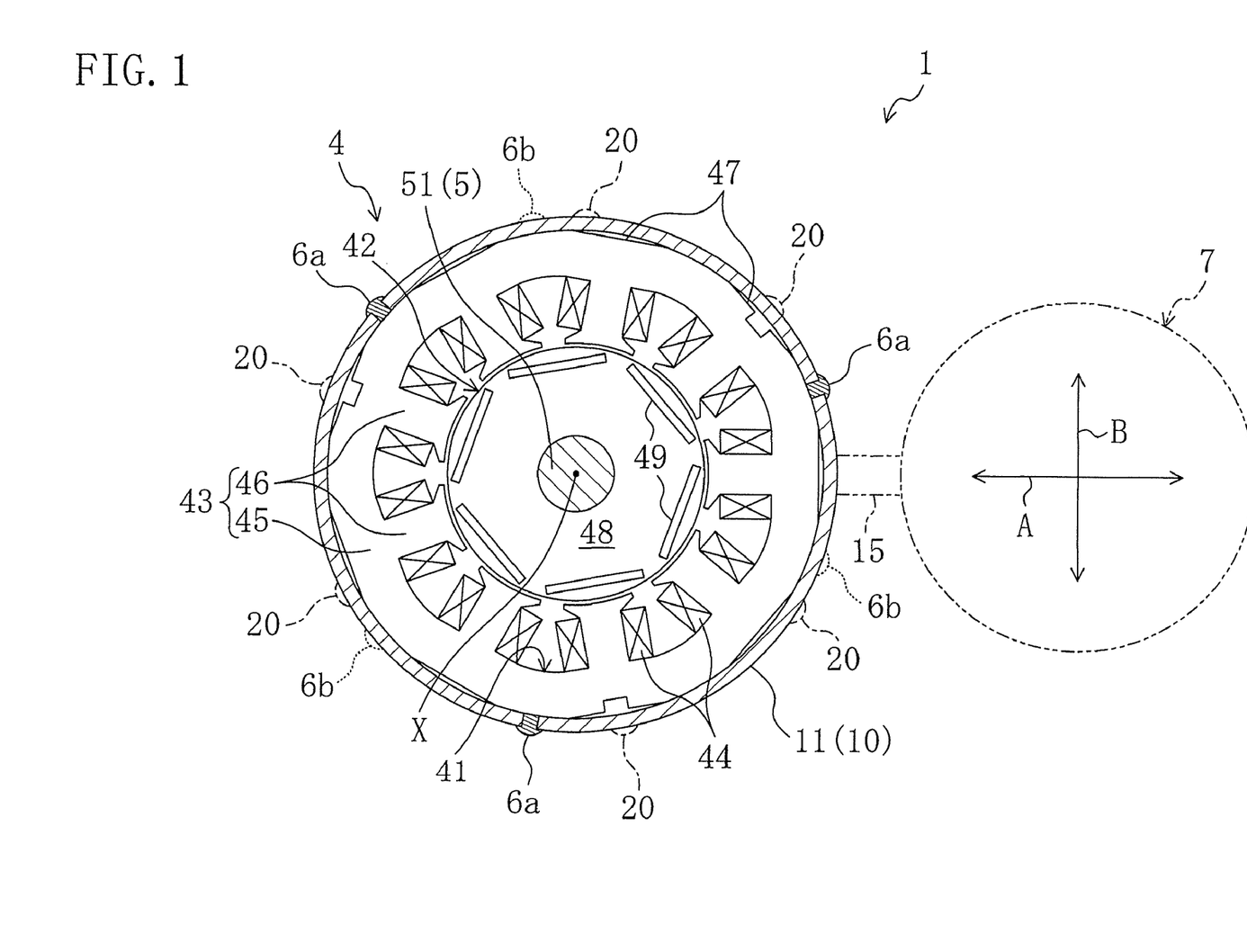
FIG. 1 is a cross-sectional view taken along line I-I of FIG. 2, showing a compressor according to an embodiment of the present invention.

The stator (41) includes a stator core (43), and coils (44) (partly omitted in FIG. 1) wound around the stator core (43), as shown in FIG. 1. The stator (41) forms the motor stator.

The stator core (43) includes an annular stator body (45), and a plurality of teeth (46, 46, . . . ) protruding radially inwardly from the inner circumference surface of the stator body (45). In the present embodiment, nine teeth (46, 46, . . . ) are provided. These teeth (46, 46, . . . ) are provided equidistantly from one another in the circumferential direction. The stator core (43) is formed by a plurality of steel plates (42a, 42a, . . . ) stacked together. These steel plates (42a, 42a, . . . ) are fixed together by swaging, for example. The coil (44) is wound around each tooth (46), and the motor (4) is a so-called "concentrated winding motor."

The stator body (45) includes core-cuts (47, 47, . . . ) formed by cutting off the stator body (45) from the top to the bottom in the outer peripheral portions of the stator body (45) corresponding to the teeth (46, 46, . . . ), i.e., in portions of the same circumferential positions as those of the teeth (46, 46, . . . ). With the core-cuts (47, 47, . . . ), the space in the casing (10) below the motor (4) communicates with the space above the motor (4).

The stator (41) having such a configuration is spot-joined to the casing (10) via a plurality of stator-side welded portions (6a, . . . , 6b, . . . ). These stator-side welded portions (6a, . . . , 6b, . . . ) are formed by spot welding, and such portions are provided at a total of six positions. These stator-side welded portions (6a, . . . , 6b, . . . ) form the spot-joined portions. The specific arrangement of the stator-side welded portions (6a, . . . , 6b, . . . ) will be described later.

On the other hand, the rotor (42) includes a rotor body (48), and magnets (49, 49, . . . ) buried in the rotor body (48). The rotor (42) forms the motor rotor.

The rotor body (48) is in a cylindrical shape, and is formed by steel plates stacked together, for example. The magnets (49, 49, . . . ) are flat-plate permanent magnets, and in the present embodiment, six magnets (49, 49, . . . ) are provided equidistantly from one another in the circumferential direction.

The rotor body (48) is fixed to the main shaft (51) of the driving shaft (5) inside the stator (41). The rotor body (48) is in a state where there is an air gap between the rotor body (48) and the stator (41).

The motor (4) having such a configuration is a so-called "6-pole 9-slot." The motor (4) rotates the rotor (42) with an electromagnetic force generated in the stator (41) as a current is passed through the coils (44). As a result, the driving force of the rotor (42) is transmitted to the compression mechanism (2) via the driving shaft (5).

An accumulator (7), which separates the coolant into a liquid coolant and a gas coolant, is connected to the compressor (1) via the suction pipe (15). The suction pipe (15) forms the connection pipe.

The accumulator (7) includes a cylindrical trunk portion (71), and bowl-shaped upper and lower lid portions (72, 73) joined to the upper and lower ends, respectively, of the trunk portion (71), as shown in FIG. 2. The suction pipe (15) is inserted through the lower end of the lower lid portion (73) of the accumulator (7), and a return pipe (74) is inserted through the upper end of the upper lid portion (72). The return pipe (74) is for guiding the coolant, circulating through a coolant circuit (not shown), to the accumulator (7), and the upstream end thereof is connected to a pipe forming the coolant circuit. The suction pipe (15) is arranged so that the upstream end thereof extends through the inside of the trunk portion (71) to the vicinity of the upper end of the trunk portion (71). On the other hand, the downstream-side portion of the suction pipe (15) extends vertically downwardly through the lower lid portion (73), and is then bent by about 90° to the horizontal direction to be connected to the suction port (14) of the casing (10). Note that the trunk portion (71) of the accumulator (7) is coupled to the trunk portion (11) of the casing (10) via an iron spacer (75).

The compressor (1) having such a configuration operates as follows.

As the power is supplied to the motor (4), the rotor (42) rotates, and the rotation of the rotor (42) is transmitted to the piston (22) of the compression mechanism (2) via the driving shaft (5). Thus, the compression mechanism (2) performs a compression operation as follows.

First, a state in which the piston (22) is in contact with the inner wall of the cylinder (21) so as to close the open end of the suction passage (29) will be described. In this state, a space in the cylinder chamber (25) that is defined between the point of contact between the cylinder (21) and the piston (22) and the blade (26) and that is behind the point of contact with respect to the rotation direction of the piston (22) serves as the low-pressure chamber (25*a*), and the volume of the low-pressure chamber (25*a*) is generally minimized. When the piston (22) rotates clockwise in FIG. 3, the open end of the suction passage (29) is released, and the volume of the low-pressure chamber (25*a*) increases along with the rotation of the piston (22), thus taking in a low-pressure gas coolant into the low-pressure chamber (25*a*). This low-pressure gas coolant is obtained as a liquid coolant is separated from the coolant from the coolant circuit through the accumulator (7). The intake of the coolant continues over about one eccentric rotation of the piston (22) until the point of contact between the cylinder (21) and the piston (22) coincides with the portion of the blade (26).

The low-pressure chamber (25*a*) thus having completely taken in the coolant then serves as the high-pressure chamber (25*b*) for compressing the coolant. The volume of the high-pressure chamber (25*b*) is generally maximized at the point when the coolant is completely taken in. When the piston (22) further rotates clockwise, the volume of the high-pressure chamber (25*b*) decreases along with the rotation of the piston (22), thus compressing the coolant inside the high-pressure chamber (25*b*). Then, when the pressure of the high-pressure chamber (25*b*) reaches a predetermined value, the reed valve (31) provided in the front head (23) is opened, and the high-pressure coolant is discharged from the high-pressure chamber (25*b*) into the casing (10) via the discharge port (30). The high-pressure coolant is first discharged into the muffler chamber (33), and after the pulsation thereof is suppressed in the muffler chamber (33), the high-pressure coolant is discharged into the space in the casing (10) above the compression mechanism (2) via the gap between the opening (32*a*) of the muffler cover (32) and the boss portion (23*b*) of the front head (23). Then, the coolant flows into the space in the casing (10) above the motor (4) via the core-cuts (47, 47, . . . ) of the stator (41), and is discharged into the coolant circuit through the discharge pipe (16).

Note that as the intake of a low-pressure coolant is completed and the low-pressure chamber (25*a*) turns to the high-pressure chamber (25*b*), a new low-pressure chamber (25*a*) is formed in the space in the cylinder chamber (25) that is behind the point of contact between the piston (22) and the cylinder (21) in the rotation direction of the piston (22). Then, the low-pressure coolant is taken in into the low-pressure chamber (25*a*), as described above, while the coolant is compressed in the high-pressure chamber (25*b*).

Next, the arrangement of the stator-side welded portions (6*a*, . . . , 6*b*, . . . ) for joining the stator (41) to the casing (10) will be described in detail.

Figure 5:
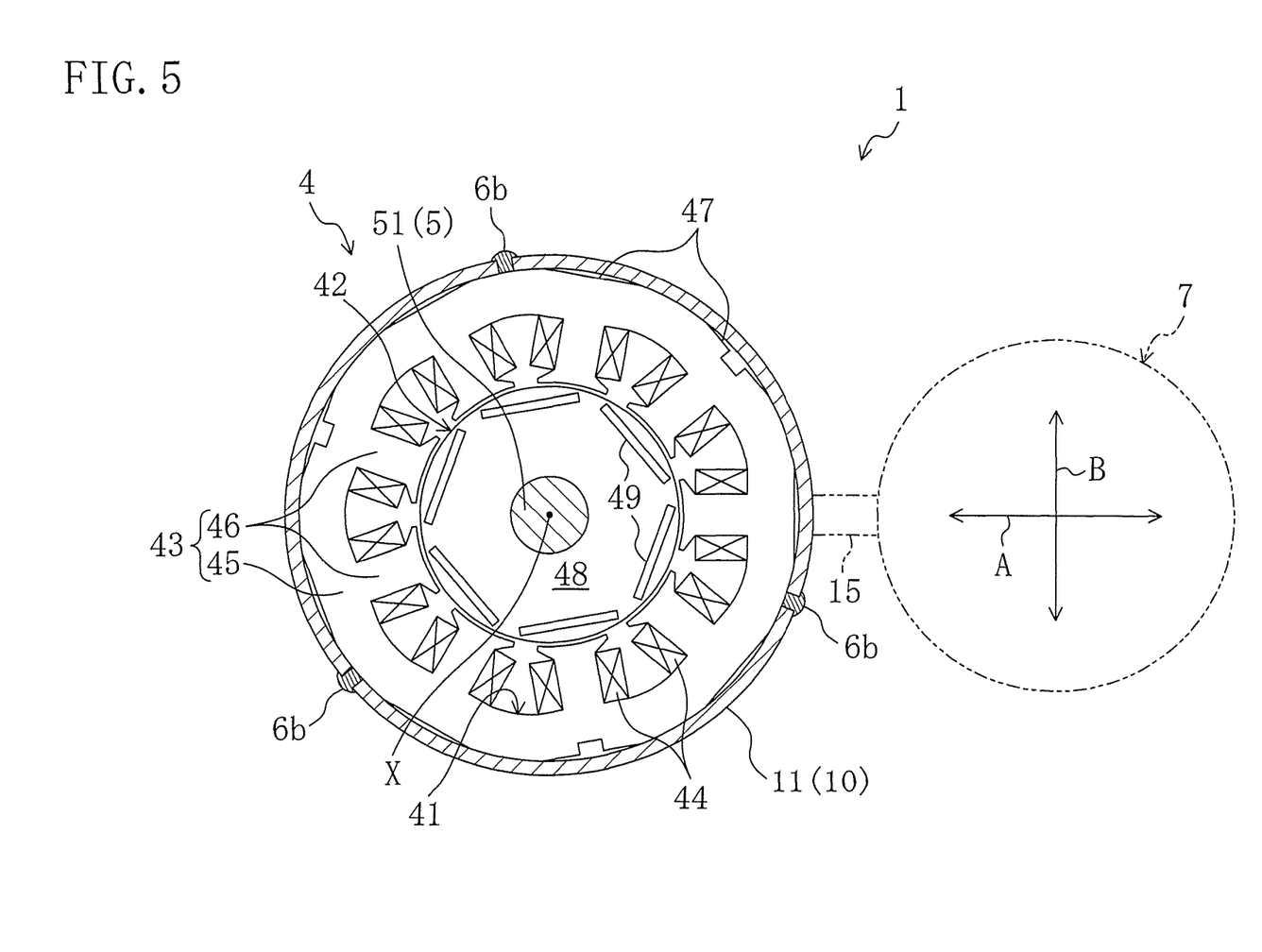
FIG. 5 is a cross-sectional view taken along line V-V of FIG. 2.

Three of the stator-side welded portions (6*a*, . . . , 6*b*, . . ) are provided on each of predetermined two planes perpendicular to the axis (X) of the driving shaft (5) (the two cross sections shown in FIGS. 1 and 5). That is, the six stator-side welded portions (6*a*, . . . , 6*b*, . . . ) include three stator-side welded portions (6*a*, 6*a*, . . . ) provided on the upper plane perpendicular to the axis (X) of the driving shaft (5) (the I-I cross section of FIG. 2) (see FIG. 1), and three stator-side welded portions (6*b*, 6*b*, . . . ) provided on the lower plane perpendicular to the axis (X) (the V-V cross section of FIG. 2) (see FIG. 5). That is, a total of six stator-side welded portions (6*a*, . . . , 6*b*, . . . ) are provided, three of which are provided in one of two predetermined positions that are different from each other in the axial direction of the driving shaft (5).

Three stator-side welded portions (6*a*, 6*a*, 6*a* (6*b*, 6*b*, 6*b*)) on each plane are arranged at an interval of 120° from one another around the axis (X) of the driving shaft (5), as shown in FIGS. 1 and 5. More specifically, each stator-side welded portion (6*a* (6*b*)) is provided in a portion of the outer circumference surface of the stator body (45) where the teeth (46, 46, . . . ) are absent, i.e., a portion of the outer circumference surface of the stator body (45) between core-cuts (47, 47) adjacent to each other in the circumferential direction. Note that while the angle between adjacent stator-side welded portions (6*a*, 6*a* (6*b*, 6*b*)) about the axis (X) is 120° in the present embodiment, the present invention is not limited to this.

The stator-side welded portions (6) on the I-I cross section and the stator-side welded portions (6) on the V-V cross section are arranged at different positions in the circumferential direction around the axis (X) of the driving shaft (5), as shown in FIG. 1. That is, the stator-side welded portions (6*a*, 6*a*, 6*a*) on the I-I cross section and the stator-side welded portions (6*b*, 6*b*, 6*b*) on the V-V cross section are arranged so that they do not overlap with one another as viewed in a direction along the axis (X) of the driving shaft (5) from a point on the axis (X). Note that in FIG. 1, the stator-side welded portions (6*a*, 6*a*, 6*a*) on the I-I cross section are denoted by solid lines, and the stator-side welded portions (6*b*, 6*b*, 6*b*) on the V-V cross section are denoted by broken lines. Three stator-side welded portions (6*a*, 6*a*, 6*a* (6*b*, 6*b*, 6*b*)) on the same cross section are arranged at an interval from one another in the circumferential direction, as described above. Therefore, all the six stator-side welded portions (6*a*, . . . , 6*b*, . . . ) are arranged at different positions in the circumferential direction around the axis (X) of the driving shaft (5).

The six stator-side welded portions (6*a*, . . . , 6*b*, . . . ) are arranged at different positions also from the compression mechanism-side welded portions (20, 20, . . . ) in the circumferential direction around the axis (X) of the driving shaft (5), as shown in FIG. 1. Note that in FIG. 1, the compression mechanism-side welded portions (20, 20, . . . ) are denoted by one-dot chain lines.

Moreover, the stator-side welded portions (6*a*, . . . , 6*b*, . . . ) are arranged so that a straight line between any two of the stator-side welded portions (not only two welded portions on the same cross section, but also two welded portions on different cross sections) does not coincide with the vibration direction of any natural vibration mode of the accumulator (7) as viewed in a plan view (as viewed in a direction along the axis (X) of the driving shaft (5) from a point on the axis (X)). Specifically, since the accumulator (7) is connected to the compressor (1) via the suction pipe (15), and is joined to the compressor (1) via the spacer (75), the accumulator (7) has one or more natural vibration modes dependent upon the weight of the accumulator (7) itself, the rigidity of the suction pipe (15), and the rigidity of the spacer (75). Particularly, the accumulator (7), which is connected to the suction pipe (15), which extends in the radial direction from the casing (10) of the compressor (1) and is then bent upward, as in the present embodiment, is likely to vibrate in a natural vibration mode that is in the direction A of the straight line between the center of gravity of the compressor (1) and the center of gravity of the accumulator (7) as viewed in a plan view, and in a natural vibration mode that is in the direction B of the straight line perpendicular to the first straight line as viewed in a plan view (although this is a natural vibration mode in the circumferential direction around the center of gravity of the compressor (1) (the axis (X) of the driving shaft (5)), it can be approximated to the direction of the straight line perpendicular to the first straight line as viewed in a plan view). In view of this, the stator-side welded portions (6a, . . . , 6b, . . . ) are arranged so that a straight line between any two of the stator-side welded portions (6a, . . . , 6b, . . . ) crosses, i.e., is not parallel to, the vibration directions of at least these two natural vibration modes.

Note that the compression mechanism-side welded portions (20, 20, . . . ) are also arranged so that a straight line between any two of the compression mechanism-side welded portions crosses, i.e., is not parallel to, the vibration directions of the natural vibration modes of the accumulator (7), particularly, the vibration direction of the natural vibration mode in the direction A and that of the natural vibration mode in the direction B, as viewed in a plan view.

Moreover, the stator-side welded portions (6a, . . . , 6b, . . . ) are arranged so that a straight line between any two of the stator-side welded portions (not only two welded portions on the same cross section, but also two welded portions on different cross sections) crosses, i.e., is not parallel to, a straight line between any two of the compression mechanism-side welded portions (20, 20, . . . ).

Therefore, according to the present embodiment, since the stator (41) of the motor (4) is spot-joined to the casing (10) via the stator-side welded portions (6a, . . . , 6b, . . . ), the cross section of the path along which the vibration of the motor (4) is transmitted is reduced, thus enabling a reduction in the vibration of the motor (4) that is transmitted to the casing (10), as compared with a configuration where the stator is joined to the casing by shrink-fit, or the like. By reducing the vibration that is transmitted to the casing (10), it is also possible to reduce the noise of the compressor (1).

Note that while portions of the stator body (45) of the stator (41) in the circumferential direction where the teeth (46, 46, . . . ) are absent are in contact with the casing (10) in the present embodiment, the stator (41) and the casing (10) may be not in contact with each other except in the stator-side welded portions (6a, . . . , 6b, . . . ). Then, it is possible to further reduce the vibration of the motor (4) that is transmitted from the stator (41) to the casing (10).

Then, as the stator-side welded portions (6a, . . . , 6b, . . . ) are arranged in different positions in the axial direction of the axis (X) of the driving shaft (5), i.e., on the I-I cross section and on the V-V cross section, the vibration of the motor (4) that is transmitted to the casing (10) can be dispersed in the axial direction. As the stator-side welded portions (6a, . . . , 6b, . . . ) are arranged at different positions in the circumferential direction around the axis (X) of the driving shaft (5), the vibration of the motor (4) that is transmitted to the casing (10) can be dispersed in the circumferential direction, as is in the axial direction.

If the vibration of the motor (4) is transmitted locally to the casing (10), the casing (10) may be vibrated strongly in a certain direction by that vibration, and large noise corresponding to that vibration may occur locally. If this noise has a strong directionality, the noise occurring locally becomes particularly problematic.

In contrast, in the present embodiment, the vibration of the motor (4) that is transmitted to the casing (10) can be dispersed in the axial direction of the axis (X) and in the circumferential direction around the axis (X), and it is therefore possible to prevent the compressor (1) from being vibrated strongly only in a certain direction and prevent noise from occurring locally from the compressor (1).

For the axial direction of the axis (X) of the driving shaft (5), at least three stator-side welded portions (6a, 6a, 6a (6b, 6b, 6b)) are provided for each axial position (on each plane perpendicular to the axis (X)), instead of providing one stator-side welded portion (6a (6b)) for each axial position, and it is therefore possible to stably join the stator (41) to the casing (10). Moreover, the angle between adjacent stator-side welded portions (6a, 6a (6b, 6b)) about the axis (X) is preferably less than 180°, as is in the present embodiment. Then, when spot-welding the stator (41), one or two or more of all the steel plates (42a, 42a, . . . ) stacked together to be welded by the stator-side welded portions (6, 6, 6) are prevented from being misaligned with the axis of the stator (41), and the stator (41) can be joined to the casing (10) in a stable state.

As the stator-side welded portions (6a, . . . , 6b, . . . ) are provided in portions of the stator body (45) of the stator (41) in the circumferential direction where the teeth (46, 46, . . . ) are absent, it is possible to further reduce the vibration of the motor (4) that is transmitted to the casing (10) via the stator-side welded portions (6a, . . . , 6b, . . . ). That is, in a concentrated winding motor, such as the motor (4) of the present embodiment, when the coil (44) is energized, a magnetic flux flows locally through the teeth (46, 46, . . . ), and therefore portions of the stator body (45) corresponding to the teeth (46, 46, . . . ) vibrate more strongly than other portions.

In view of this, as the stator-side welded portions (6a, . . . , 6b, . .) are arranged while avoiding portions of the stator body (45) corresponding to the teeth (46, 46, . . . ), it is possible to prevent the vibration of the teeth (46, 46, . . . ) from being transmitted directly to the casing (10) via the stator-side welded portions (6a, . . . , 6b, . . . ), and it is possible to reduce the vibration of the motor (4) that is transmitted to the casing (10). Since the core-cuts (47, 47, . . . ) are provided on portions of the outer circumference surface of the stator body (45) corresponding to the teeth (46, 46, . . . ), the gaps between portions of the stator body (45) corresponding to the teeth (46, 46, . . . ) and the casing (10) are larger than those in other portions. Therefore, portions of the stator body (45) corresponding to the teeth (46, 46, . . . ) can be reliably not in contact with the casing (10), and it is possible to reliably prevent the vibration from being transmitted directly from portions of the stator body (45) corresponding to the teeth (46, 46, . . . ) to the casing (10).

Moreover, as the stator-side welded portions (6a, . . . , 6b, . . . ) and the compression mechanism-side welded portions (20, 20, . . . ) are arranged at different positions in the circumferential direction around the axis (X) of the driving shaft (5), it is possible to reduce the vibration and the noise of the compressor (1).

Specifically, the rotor (42), which is rotated by the electromagnetic force of the stator (41), vibrates accordingly if the stator (41) vibrates. The vibration of the rotor (42) is transmitted to the compression mechanism (2) via the driving shaft (5), to which the rotor (42) is fixed, and is transmitted to the casing (10) via the compression mechanism-side welded portions (20, 20, . . . ), at which the compression mechanism (2) is joined to the casing (10). That is, paths along which the vibration of the stator (41) is transmitted to the casing (10) include a path along which the vibration is transmitted to the casing (10) via the stator-side welded portions (6a, . . . , 6b, . . . ), and a path along which the vibration is transmitted to the casing (10) via the rotor (42), the driving shaft (5), the compression mechanism (2), and the compression mechanism-side welded portions (20, 20, . . . ), Therefore, if the stator-side welded portions (6a, . . . , 6b, . . . ) and the compression mechanism-side welded portions (20, 20, . . . ) are arranged at the same positions in the circumferential direction around the axis (X) of the driving shaft (5), the vibration of the motor (4) that is transmitted to the casing (10) via the stator-side welded portions (6a, . . . , 6b, . . . ) and the vibration of the motor (4) that is transmitted to the casing (10) via the compression mechanism-side welded portions (20, 20, . . . ) may be transmitted to the same position in the circumferential direction around the axis (X), thereby strongly vibrating the compressor (1) or causing loud noise in the compressor (1).

The compression mechanism (2) has its torque fluctuating depending on the phase of compression of the coolant, and the compression mechanism (2) itself is also vibrating. That is, the vibration of the compression mechanism (2) is also transmitted to the casing (10) via the compression mechanism-side welded portions (20, 20, . . . ). Therefore, if the stator-side welded portions (6a, . . , 6b, . . . ) and the compression mechanism-side welded portions (20, 20, . . . ) are arranged at the same positions in the circumferential direction around the axis (X) of the driving shaft (5), the vibration of the motor (4) that is transmitted to the casing (10) via the stator-side welded port ions (6a, . . . , 6b, . . . ) and the vibration of the compression mechanism (2) that is transmitted to the casing (10) via the compression mechanism-side welded portions (20, 20, . . . ) may resonate together, thereby strongly vibrating the compressor (1) or causing loud noise in the compressor (1).

In contrast, in the present embodiment, where the stator-side welded portions (6a, . . . , 6b, . . . ) and the compression mechanism-side welded portions (20, 20, . . . ) are arranged at different positions in the circumferential direction around the axis (X) of the driving shaft (5), the vibration of the motor (4) that is transmitted to the casing (10) via the stator-side welded portions (6a, . . . , 6b, . . . ) and the vibration of the motor (4) that is transmitted to the casing (10) via the compression mechanism-side welded portions (20, 20, . . . ) can be dispersed in the circumferential direction around the axis (X) of the driving shaft (5), and the vibration of the motor (4) that is transmitted to the casing (10) via the stator-side welded portions (6a, . . . , 6b, . . . ) and the vibration of the compression mechanism (2) that is transmitted to the casing (10) via the compression mechanism-side welded portions (20, 20, . . . ) can be dispersed in the circumferential direction around the axis (X) of the driving shaft (5). Thus, it is possible to prevent the compressor (1) from being vibrated strongly only in a certain direction and prevent noise from occurring locally from the compressor (1).

Moreover, as the stator-side welded portions (6a, . . . , 6b, . . . ) are arranged so that a straight line between any two of the stator-side welded portions (6a, . . . , 6b, . . . ) crosses, i.e., is not parallel to, the vibration direction of a natural vibration mode of the accumulator (7), it is possible to prevent the resonance between the compressor (1) and the accumulator (7) due to the vibration of the motor (4).

That is, if the vibration of the motor (4) is transmitted to the casing (10) via the stator-side welded portions (6a, . . , 6b, . . . ), portions of the compressor (1) where the stator-side welded portions (6a, . . . , 6b, . . . ) are provided not only vibrate in the radial direction, the axial direction and the circumferential direction of the axis (X), but also vibrate in the direction of a straight line between any two of the stator-side welded portions (6a (6b), 6a (6b)). That is, if a straight line between any two of the stator-side welded portions (6a (6b), 6a (6b)) is parallel to the vibration direction of a natural vibration mode of the accumulator (7), the compressor (1), which is vibrated by the vibration of the motor (4), vibrates the accumulator (7) in the vibration direction of the natural vibration mode, which may result in a resonance between the compressor (1) and the accumulator (7).

In view of this, by arranging the stator-side welded portions (6a, . . . , 6b, . . . ) so that a straight line between any two of the stator-side welded portions is not parallel to the vibration direction of a natural vibration mode of the accumulator (7), it is possible to suppress the resonance between the compressor (1) and the accumulator (7). Particularly, the accumulator (7) of the present embodiment is likely to vibrate in a natural vibration mode that is in the direction A of the straight line between the center of gravity of the compressor (1) and the center of gravity of the accumulator (7) as viewed in a plan view, and in a natural vibration mode that is in the direction B of the straight line perpendicular to the first straight line as viewed in a plan view. In view of this, by arranging the stator-side welded portions (6a, . . . , 6b, . . . ) so that a straight line between any two of the stator-side welded portions is not parallel to the vibration directions of these two natural vibration modes, it is possible to more reliably suppress the resonance between the compressor (1) and the accumulator (7). Note that it is preferred that the stator-side welded portions (6a, . . . , 6b, . . . ) are arranged so that a straight line between any two of the stator-side welded portions is also not parallel to the vibration direction of a natural vibration mode of the accumulator (7) other than the above two natural vibration modes. Then, it is possible to even more reliably suppress the resonance between the compressor (1) and the accumulator (7).

By arranging the stator-side welded portions (6a, . . , 6b, . . . ) so that a straight line between any two of the stator-side welded portions (6a, . . . , 6b, . . . ) is not parallel to a straight line between any two of the compression mechanism-side welded portions (20, 20, . . . ), it is possible to prevent the compressor (1) from being vibrated strongly only in a certain direction and prevent noise from occurring locally from the compressor (1).

That is, the vibration of the motor (4) and the vibration of the compression mechanism (2) are transmitted to the casing (10) via the compression mechanism-side welded portions (20, 20, . . . ), as described above, and as a result, the compression mechanism-side welded portions (20, 20, . . . ) of the compressor (1) vibrate not only in the radial direction, the axial direction and the circumferential direction of the axis (X) of the driving shaft (5), but also in the direction of a straight line between any two of the compression mechanism-side welded portions (20, 20). Therefore, if a straight line between two of the stator-side welded portions (6a, . . . , 6b, . . . ) is parallel to a straight line between two of the compression mechanism-side welded portions (20, 20, . . . ), the compressor (1) is vibrated strongly in the direction of the parallel straight lines, and loud noise occurs in that direction.

In view of this, by arranging the stator-side welded portions (6a, . . . , 6b, . . . ) so that straight line between any two of the stator-side welded portions is not parallel to a straight line between any two of the compression mechanism-side welded portions (20, 20, . . . ), the vibration of the compressor (1) in the direction of a line between any two stator-side welded portions (6, 6) can be prevented from being in the same direction as the vibration of the compressor (1) in the direction of a line between any two compression mechanism-side welded portions (20, 20), and it is possible to prevent the compressor (1) from being vibrated strongly only in a certain direction and prevent noise from occurring locally from the compressor (1).

Note that by arranging the compression mechanism-side welded portions (20, 20, ...) so that a straight line between any two of the compression mechanism-side welded portions (20, 20, ...) is not parallel to the vibration direction of a natural vibration mode of the accumulator (7), it is possible to prevent the resonance between the compressor (1) and the accumulator (7) due to the vibration of the motor (4) and the vibration of the compression mechanism (2) that are transmitted to the casing (10) via the compression mechanism-side welded portions (20, 20, ...). Particularly, the accumulator (7) of the present embodiment vibrates relatively strongly in a natural vibration mode in the circumferential direction around the axis (X) of the compressor (1) as viewed in a plan view, and in a natural vibration mode in the direction of the straight line between the center of gravity of the compressor (1) and the center of gravity of the accumulator (7). Therefore, by arranging the compression mechanism-side welded portions (20, 20, ...) so that a straight line between any two of the compression mechanism-side welded portions is not parallel to the vibration directions of these two natural vibration modes, it is possible to more reliably suppress the resonance between the compressor (1) and the accumulator (7). Note that it is preferred that the compression mechanism-side welded portions (20, 20, ...) are arranged so that a straight line between any two of the compression mechanism-side welded portions is also not parallel to the vibration direction of a natural vibration mode of the accumulator (7) other than the above two natural vibration modes. Then, it is possible to even more reliably suppress the resonance between the compressor (1) and the accumulator (7).

Alternative Embodiments

In conjunction with the embodiment above, the present invention may employ configurations as follows.

That is, while a total of six stator-side welded portions (6a, ..., 6b, ...) are provided in the above description, the number is not limited to six. It is only defined that a plurality of stator-side welded portions be provided at different positions in the axial direction and the circumferential direction of the axis (X) of the driving shaft (5).

While the stator-side welded portions (6a, ..., 6b, ...) are provided on two planes perpendicular to the axis (X), the present invention is not limited to this. That is, it is not required that a plurality of stator-side welded portions be provided on a predetermined plane, but it is only defined that a plurality of stator-side welded portions be provided at different positions in the axial direction of the axis (X). Note however that in order to stably attach the stator (41) to the casing (10), it is preferred that a plurality of stator-side welded portions are provided on a plurality of planes perpendicular to the axis (X), with three or more stator-side welded portions provided on each of the planes, as are in the embodiment above.

Moreover, the motor (4) is not limited to a concentrated winding motor. Since any motor produces some vibration, it is possible, by employing the embodiment above, to reduce the vibration of the motor that is transmitted to the casing (10), and to disperse the vibration in the axial direction and the circumferential direction of the axis (X), thereby reducing the vibration and the noise of the compressor (1).

The compressor (1) is not limited to a high pressure dome-type or a rotary compressor, but may be any type of a compressor.

Note that the embodiment above is essentially illustrative of a preferred embodiment, and is not intended to limit the present invention, applications thereof, or the range of applications thereof.

INDUSTRIAL APPLICABILITY

As described above, the present invention is useful for use in a compressor including a compression mechanism, a motor, and a casing.

What is claimed is:

1. A compressor comprising:
a compression mechanism;
a motor coupled to the compression mechanism via a driving shaft; and
a casing configured to accommodate the compression mechanism and the motor therein,
the motor including a motor stator and a motor rotor disposed inside the motor stator, the motor rotor being coupled to the driving shaft,
the motor stator being spot-joined to the casing via a plurality of stator spot-joined portions disposed at different positions along an axial direction of the driving shaft, and
each of the stator spot-joined portions being disposed at a different position along a circumferential direction about the driving shaft.

2. The compressor of claim 1, further comprising
an accumulator connected to the casing via a connection pipe to define a vibration direction of a natural vibration mode of the accumulator,
straight lines through every combination of any two of the plurality of stator spot-joined portions crossing the vibration direction of the natural vibration mode of the accumulator as viewed along a direction parallel to the axial direction of the driving shaft.

3. The compressor of claim 2, wherein
the accumulator vibrates in a first vibration direction of a first natural vibration mode of the accumulator along a center line through a center of gravity of the casing and a center of gravity of the accumulator as viewed along the direction parallel to the axial direction of the driving shaft, and
the accumulator vibrates in a second vibration direction of a second natural vibration mode of the accumulator along a direction perpendicular to the center line as viewed along the direction parallel to the axial direction of the driving shaft.

4. The compressor of claim 2, wherein
the compression mechanism is spot-joined to the casing via a plurality of compression mechanism-side spot-joined portions, and
each of the stator spot-joined portions is disposed at a different position from the compression mechanism-side spot-joined portions along the circumferential direction about the driving shaft.

5. The compressor of claim 1, wherein
the compression mechanism is spot-joined to the casing via a plurality of compression mechanism-side spot-joined portions, and
each of the stator spot-joined portions is disposed at a different position from the compression mechanism-side spot-joined portions along the circumferential direction about the driving shaft.

6. The compressor of claim 1, wherein
the motor stator includes an annular stator body and a plurality of teeth protruding radially inwardly from an inner circumference surface of the stator body, and
the motor is a concentrated winding motor in which coils are wound around the teeth.

7. The compressor of claim 6, wherein
the plurality of stator spot-joined portions are disposed at positions different from positions of the teeth of the motor stator along the circumferential direction about the driving shaft.

8. The compressor of claim 1, wherein
the motor stator includes a plurality of steel plates stacked in the axial direction of the driving shaft, and
at least three of the stator spot-joined portions are provided in each of at least two planes perpendicular to the axial direction of the driving shaft.

9. A compressor comprising:
a compression mechanism;
a motor coupled to the compression mechanism via a driving shaft;
a casing configured to accommodate the compression mechanism and the motor therein; and
an accumulator connected to the casing via a connection pipe to define a vibration direction of a natural vibration mode of the accumulator,
the motor including a motor stator and a motor rotor disposed inside the motor stator, the motor rotor being coupled to the driving shaft,
the motor stator being spot-joined to the casing via a plurality of stator spot-joined portions, with each stator spot-joined portion being disposed at a different position along a circumferential direction about the driving shaft, and there being at least three stator spot-joined portions, and
straight lines through every combination of any two of the plurality of stator spot-joined portions crossing the vibration direction of the natural vibration mode of the accumulator as viewed along a direction parallel to an axial direction of the driving shaft.

10. The compressor of claim 9, wherein
the compression mechanism is spot-joined to the casing via a plurality of compression mechanism-side spot-joined portions, and
each of the stator spot-joined portions is disposed at a different position from the compression mechanism-side spot-joined portions along the circumferential direction about the driving shaft.

11. The compressor of claim 10, wherein
the accumulator vibrates in a first vibration direction of a first natural vibration mode of the accumulator along a center line through a center of gravity of the casing and a center of gravity of the accumulator as viewed along the direction parallel to the axial direction of the driving shaft, and
the accumulator vibrates in a second vibration direction of a second natural vibration mode of the accumulator along a direction perpendicular to the center line as viewed along the direction parallel to the axial direction of the driving shaft.

12. The compressor of claim 9, wherein
the accumulator vibrates in a first vibration direction of a first natural vibration mode of the accumulator along a center line through a center of gravity of the casing and a center of gravity of the accumulator as viewed along the direction parallel to the axial direction of the driving shaft, and
the accumulator vibrates in a second vibration direction of a second natural vibration mode of the accumulator along a direction perpendicular to the center line as viewed along the direction parallel to the axial direction of the driving shaft.

13. The compressor of claim 9, wherein
the motor stator includes an annular stator body and a plurality of teeth protruding radially inwardly from an inner circumference surface of the stator body, and
the motor is a concentrated winding motor in which coils are wound around the teeth.

14. The compressor of claim 13, wherein
the plurality of stator spot-joined portions are disposed at positions different from positions of the teeth of the motor stator along the circumferential direction about the driving shaft.

15. The compressor of claim 9, wherein
the motor stator includes a plurality of steel plates stacked in the axial direction of the driving shaft, and
at least three of the stator spot-joined portions are provided in each of at least two planes perpendicular to the axial direction of the driving shaft.

16. A compressor comprising:
a compression mechanism;
a motor coupled to the compression mechanism via a driving shaft; and
a casing configured to accommodate the compression mechanism and the motor therein,
the motor including a motor stator and a motor rotor disposed inside the motor stator, the motor rotor being coupled to the driving shaft,
the compression mechanism being spot-joined to the casing via a plurality of compression mechanism-side spot-joined portions,
the motor stator being spot-joined to the casing via a plurality of stator spot-joined portions, with each stator spot-joined portion being disposed at a different position along a circumferential direction about the driving shaft, and
each of the stator spot-joined portions being disposed at a different position from positions of the compression mechanism-side spot-joined portions along the circumferential direction about the driving shaft.

17. The compressor of claim 16, wherein
the motor stator includes an annular stator body and a plurality of teeth protruding radially inwardly from an inner circumference surface of the stator body, and
the motor is a concentrated winding motor in which coils are wound around the teeth.

18. The compressor of claim 17, wherein
the plurality of stator spot-joined portions are disposed at positions different from positions of the teeth of the motor stator along the circumferential direction about the driving shaft.

19. The compressor of claim 16, wherein
the motor stator includes a plurality of steel plates stacked in the axial direction of the driving shaft, and
at least three of the stator spot-joined portions are provided in each of at least two planes perpendicular to the axial direction of the driving shaft.

* * * * *